Figure 1:
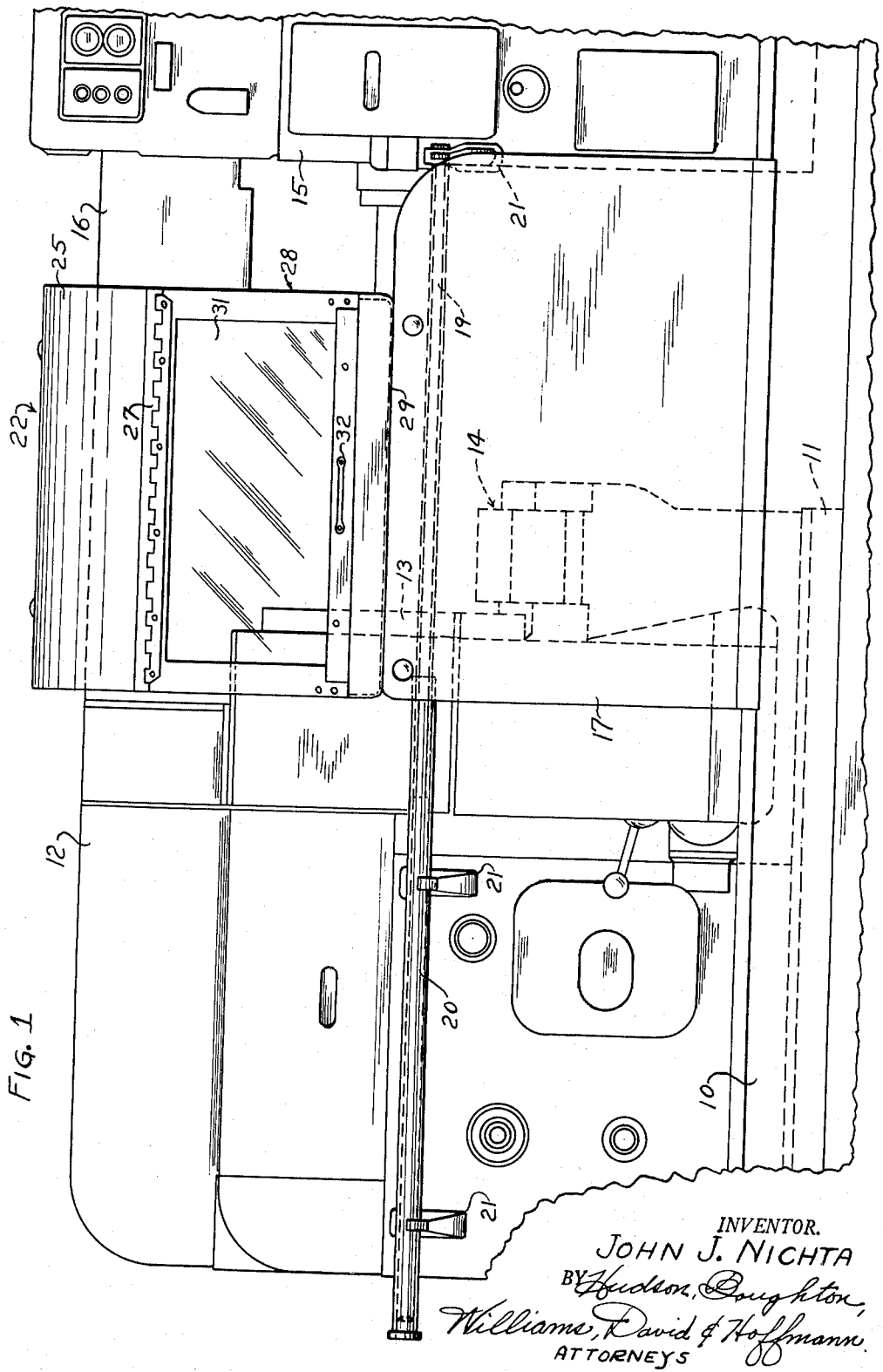

Aug. 9, 1955 J. J. NICHTA 2,714,926
SPLASH GUARDS FOR MACHINE TOOLS
Filed June 6, 1952 2 Sheets-Sheet 1

INVENTOR.
JOHN J. NICHTA
BY Hudson, Boughton,
Williams, David & Hoffmann
ATTORNEYS Aug. 9, 1955  J. J. NICHTA  2,714,926
SPLASH GUARDS FOR MACHINE TOOLS
Filed June 6, 1952  2 Sheets-Sheet 2

INVENTOR.
JOHN J. NICHTA
BY Hudson, Coughton
Williams, David & Hoffman
ATTORNEYS US United States Patent Office 2,714,926
Patented Aug. 9, 1955

2,714,926
SPLASH GUARDS FOR MACHINE TOOLS

John J. Nichta, Parma, Ohio, assignor to The Warner & Swasey Company, Cleveland, Ohio, a corporation of Ohio Application June 6, 1952, Serial No. 292,063

5 Claims. (Cl. 160—191)

This invention relates to guards for machine tools and, more particularly, to movable guards for confining coolant and flying chips within the working area or region of a machine tool.

Modern machine tools operate at high speeds and are provided with multiple groups of cutting tools which simultaneously perform a plurality of cutting operations on the work piece so that liquid coolants must be continuously supplied over a large area and in large quantities. This results in considerable splashing of the liquid beyond the working region or area so that it is not only wasteful of the coolant but also makes it difficult to approach the machine closely enough to observe the operations. Moreover, the multiple operations at high speed also create a large quantity of chips which should not be allowed to spread or fly beyond the working region or area of the machine. In an effort to confine the chips and coolant to the working areas or regions of machine tools, splash and chip guards of various types have heretofore been proposed but these have generally proved cumbersome and unwieldly to handle and often limited accessibility to the various tool holders and cutting tools.

An object of this invention is to provide an improved coolant and chip guard for a machine tool which is readily moved to and from active position with a minimum of effort by the machine operator and which will remain in either the active or inactive position to which it is moved without the necessity of latches or props.

Another object of the invention is to provide an improved coolant and splash guard for a machine tool, which guard is formed by two members hinged to each other and to the machine for movement about a horizontal axis with spring means substantially counterbalancing the weight of the members in all positions thereof.

A further object of the invention is to provide an improved coolant and chip guard of the type set forth in the two preceding paragraphs and wherein one of the two members of the guard is disposed substantially vertically when the guard is in active or inactive position and is provided with means guiding its movement to retain its vertical position as the guard is swung between the active and inactive positions.

An additional object of the invention is to provide an improved coolant and chip guard as defined in the preceding paragraph and wherein the said one member is provided with a transparent portion to facilitate observation of the work when the guard is in active or operative position.

Figure 2:
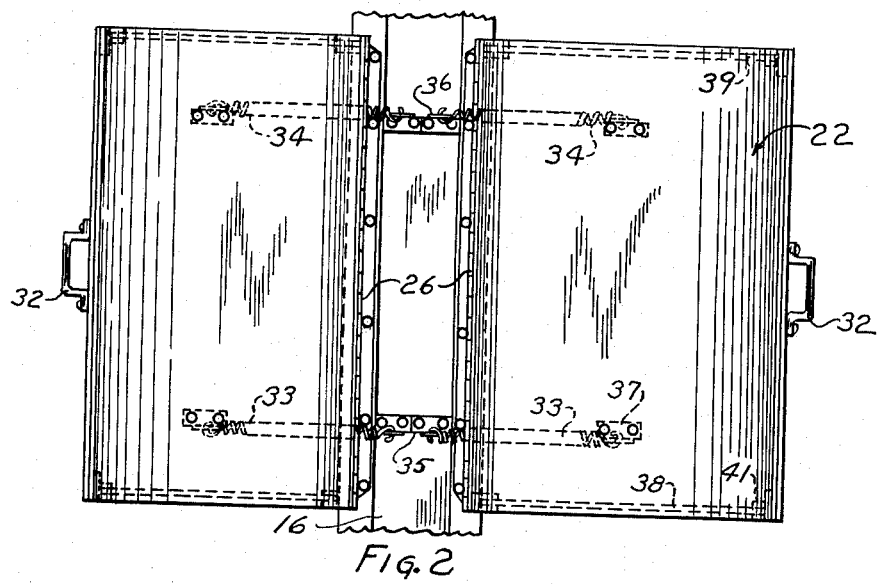
Figure 3:
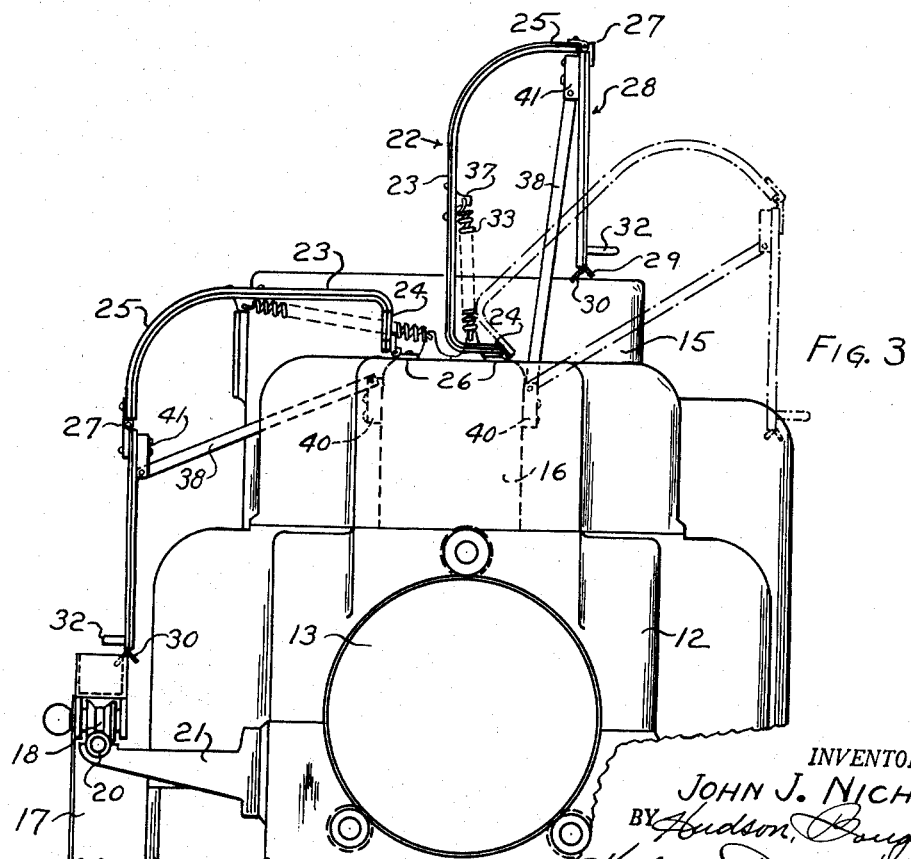

The invention further resides in certain novel features of the construction and arrangement of the parts of the apparatus, and further objects and advantages of the invention will be apparent to those skilled in the art to which the invention pertains from the following description of the present preferred embodiment thereof, described with reference to the accompanying drawings, in which:

Fig. 1 is a view in front elevation of a portion of a multiple spindle, automatic machine tool provided with the present preferred form of the improved splash and chip guards constructed in accordance with this invention, and guard members being shown in active or operative position;

Fig. 2 is a plan view of the guards for the machine tool shown in Fig. 1 but with the machine tool broken away except for the portion of the frame member thereof to which the guards are attached; and Fig. 3 is a fragmentary end view of the machine tool and guards shown in Figs. 1 and 2 as seen from the left-hand side of Fig. 1 with one of the guards shown in full lines in elevated or inactive position and represented by broken lines at an intermediate position.

The splash and chip guards of this invention may be adapted for use upon a variety of different types of machine tools. However, for the sake of brevity of disclosure, the guards are here illustrated and described only with respect to the manner in which they are provided upon a multiple spindle, automatic machine tool of the lathe type. It is to be understood, however, that this restriction of the drawings and description to the application of the novel guards to such a machine tool does not preclude the use of the basic principles of the invention in guards for other machines.

The machine tool here illustrated is of the type known in the trade as a multiple spindle, automatic type and comprises the usual chip pan 10 which is suitably supported on a base, not shown, that supports the bed 11 of the machine tool. Rising from the bed 11 is the headstock 12 in which is rotatably journaled the spindle carrier 13. The forward portion of the bed 11 is provided with transversely extending inclined ways on which are slidably supported cross slides 14 having suitable tool carriers. These tool carriers are adapted to move the tools transversely relative to the work supported in chucks on the work spindles and which are rotatably mounted in the spindle carrier 13.

The machine tool also includes a vertically extending column 15 in horizontally spaced relationship to the headstock 12 in which the controls and certain of the other operating instrumentalities of the machine tool are located, the column 15 and the headstock 12 being connected adjacent the tops thereof by a horizontally extending frame member 16. Consequently, a horizontally disposed longitudinally extending work area or region is provided between the headstock 12 and column 15 and beneath the horizontal frame member 16. Within this work region or area the machining operations are performed and hence it is in this region that liquid coolant is supplied to the variously located cutting tools in copious quantities by means not shown. This coolant, due to the high speed of operation of the work holding spindles of the machine and the multiple cutting operations simultaneously performed on the work, tends to splash beyond the work area, and in some cases the chips likewise tend to fly outwardly beyond the area of the chip pan 10.

In order to reduce the splashing of coolant and flying of chips a machine of the type here disclosed is conventionally provided with apron-type lower guard members 17, one on either side of the machine, which are formed of sheet metal or the like and extend vertically from a point above the cross slides 14 down to the chip pan 10. These aprons 17 are horizontally movable longitudinally of the machine by means of spaced flanged rollers 18, see Fig. 3, which ride upon rods 19 and/or tubes 20 extending longitudinally on either side of the machine and supported thereon by suitable brackets such as 21. The rods 19 may be telescoped within the tubes 20 when the aprons 17 are moved to the left, as viewed in Fig. 1, if it be desired to move these rods and thereby provide greater ease of access to the working area. The lower end of each apron or lower guard 17 preferably overhangs the upper edge of the chip pan 10, and the upper edge of the apron 17 has an inwardly directed portion overlying the rollers 18 and supporting rods 19, as will be apparent in Fig. 3.

In accordance with this invention the working region or area above the upper edge of the conventional guard aprons 17 is provided with novel chip and splash guards which are movably mounted upon the horizontally extending frame member 16 of the machine. In the illustrated machine tool two such guard assemblies are shown, one on either side of the center of the machine tool. These guard assemblies are identical and hence the same reference numbers are employed for like parts of both and but one assembly will be described in detail.

Each of the novel splash guard assemblies is formed of two longitudinally extending members. The first or upper of these members, designated generally 22, has a substantially planar main portion 23, the longitudinal edges of which are bent to provide integral extension portions 24 and 25 which are disposed at substantially right angles with respect to the main portion 23. The radius of curvature between the main portion 23 and the extension 24 is relatively small while the radius of curvature between the main portion 23 and the extension 25 is relatively large, as will be apparent from the drawings, and the lower edge of the portion 25 extends downwardly a greater distance than the edge of the portion 24 when the guard member 22 is disposed with its main portion 23 in a horizontal position. The lower edge of the extension portion 24 is hinged to the frame member 16 for pivotal movement about a horizontal axis. The hinge means 26 employed for this purpose may be of any suitable type and may be suitably secured to the frame member and cover member by any convenient means such as bolting, welding or the like.

The lower edge of the extension portion 25 of the guard member 22 is also provided with a longitudinally extending hinged means 27 which is connected to the upper longitudinal edge of the second member 28 of the splash guard assembly. This second member 28 of the splash guard assembly is substantially planar, is of generally rectangular configuration, and is adapted to extend vertically downward both when in active and when in inactive positions or when being moved from one position to the other. The lower edge of the member 28 is provided with longitudinally extending downwardly diverging portions 29 and 30 which are adapted to engage over the upper edge of the apron member 17 when the guard member is in active position, as indicated at the left in Fig. 3. Observation of the work during a machining operation with the guard members in active position is possible by virtue of the fact that the member 28 is provided with a transparent portion or panel 31 which may be of safety glass or suitable plastic material and secured to the surrounding portions of the member 28 by any suitable means. Beneath the transparent portion 31 the member 28 is provided with a suitable handle means 32 by which the guard assembly may be moved to and from the active or operative position.

The novel guard assembly of this invention is counterbalanced by spring means so that movement thereof to and from active position can be effected with a minimum of effort and so that the guard assembly will be retained at either of its positions without the need of latches, props or other expedients. In addition, the spring means tends to reduce noise due to vibratory movement of the individual members of the guard during operation of the machine. In the illustrated embodiment, this spring means comprises a pair of spaced extension springs 33 and 34, each of which is connected at one end to a suitable bracket, such as 35, 36, respectively, extending upwardly from the frame member 16. The other ends of the springs 33 and 34 are each secured to suitable bracket members such as 37 which are secured to the main portion 23 of the guard member 22 intermediate the hinging means 26 and 27, the springs extending through suitable openings in the extension member 24 of the guard member, as will be apparent from Figs. 2 and 3.

The springs 33, 34 act at all times in a direction which tends to elevate the guard members 22 and 28 to inactive position, that is, to the elevated position as shown for the right-hand guard member assembly in Fig. 3. However, the force exerted by the springs is such that they substantially counterbalance the weight of the members for all positions of the latter so that the guard members can be placed in a desired position and retained therein without the need of latches or props. Preferably, the force exerted by the springs when the guard members are in active position, corresponding to that shown in Fig. 1, is slightly less than the turning moment produced by the combined center of gravity of the members about the pivot of the hinging means 26 so that the guard members will remain in the active position shown. However, as the guard members are elevated by means of the handle 32 the combined center of gravity of the members moves so that its turning moment about the hinging means 26 decreases until it is a minimum when the guard members are in their inactive positions, shown in the right-hand portion of Fig. 3. The center line of each of the spring means 33, 34 continuously remains on one side of the hinging means 26 and, consequently, the force exerted by these spring means likewise decreases as the guard members are moved to inactive position until the force thus exerted is a minimum when the members are positioned so that they both extend substantially vertically. The rocking or partial rotation of the guard members in this direction is limited by engagement of the extension portion 24 of the member 22 with the frame member 16, or with the securing means for the hinge means 26, and, hence, the tendency of the springs 33, 34 to produce further rotation in this direction, holds the guard members in inactive position until they are positively moved therefrom. The force required to move the guard members from inactive position is, however, relatively small since, as noted before, the force exerted by the springs in this position is at a minimum and is only such as to substantially counterbalance the weight of the members.

The movement of the guard member 28 is positively controlled at all times so that this member remains substantially vertically and cannot flap idly about its hinging means 27 when moved from active position or is returned to active position. This guiding of the member 28 is achieved by link means connected between the member and the frame member 16. In the illustrated embodiment two links 38 and 39 are employed. These links are identical and each comprises a rigid bar or elongated member pivoted at one end to a suitable bracket 40 on the frame member 16 and at the other end to a block or bracket 41 on the guard member 28 adjacent the side edge of the latter and in the vicinity of the hinging means 27. The bracket or block 40 is preferably provided on the forward side of the frame member 16 below the plane of the hinge means 26 and the length of the links 38, 39 is therefore less than the distance between the hinge means 26 and 27 so that the guard member 28 is maintained substantially vertically in all locations to which it is moved. This substantially vertical position of the member 28 throughout its movement prevents the latter from inadvertently contacting the tools or work when the guard is raised. Moreover, any coolant striking upon the member 28, even when the latter is raised or partially raised, is kept within the confines of the chip pan. In addition, the guard member 28 is guided as it is lowered to facilitate engagement of the diverging members 29 and 30 over the upper edge of the lower or slidable guard member 17 so that there can be no leakage of coolant at this point. In this regard it will be observed that the member 30 provided at this edge of the guard member is inclined inwardly sufficiently so that coolant running downwardly over the inner surface of the guard member 28 is directed inwardly of the machine tool and cannot enter the joint between the guard member 28 and the apron 17.

It will now be apparent that a guard assembly of the type illustrated and described may be readily moved to and from active position with a minimum effort on the part of the operator due to the counterbalancing action of the springs 33 and 34. These springs also serve to reduce vibratory noises such as frequently occur in hinged members as the parts wear. The novel guard assembly also has the advantage of providing maximum protection to the operator since the portion 28 thereof is always positioned so that any drippings therefrom are received in the pan 10. Moreover, some protection is provided for the operator even when the portion 28 is partially elevated due to the controlled movement thereof as the result of the presence of the links 38 and 39, which links also insure against the guard member 28 contacting the spindles or tools when the guard is raised.

Although the invention has been illustrated and described as embodied in a coolant and splash guard means for a multiple spindle, automatic machine tool, it will be apparent that similarly constructed guard means may be utilized for machine tools of other types. For example, the principle of the two-part counterbalanced guard with the lower section guided in its movement may be utilized as a chuck guard for a conventional single spindle turret lathe by suspending the guard member from a stationary horizontally extending rod or member similar to the pilot bar on that type of a machine tool. Other uses, adaptations and alterations of the invention will be readily apparent to those skilled in the art, and, consequently, the invention is not to be construed as restricted to the details of construction here illustrated and described except as may be required by the spirit and scope of the appended claims.

Having thus described the invention, I claim:

1. A splash and chip guard adapted to be used with a machine tool of the type having a longitudinally extending work area and a horizontal longitudinally extending frame member located centrally above the work area and comprising a first member, hinge means secured to said first member at one longitudinal edge thereof and adapted to be secured to the horizontally extending frame member of the machine tool for pivotally connecting the first member thereto for swinging movement about a horizontal axis between substantially vertical and horizontal positions, a second member, means hinging the second member at its upper longitudinal edge to the other longitudinal edge of the first member so that said second member extends substantially vertically downwardly when said first member is positioned substantially horizontally, rigid link means pivotally connected at one end thereof to said second member at a location thereon adjacent the longitudinal upper edge of said second member and adapted to be pivotally connected at the opposite end thereof to said frame member of the machine tool at a lower level than said first mentioned hinge means to maintain said second member always in a vertical position as said first member is moved between the horizontal and vertical positions, and an elongated spring means connected at one end thereof to said first member between the two mentioned hinging means and adapted to be connected at the other end thereof to said frame member of the machine tool in a manner such that the force of said spring varies in accordance with variations in the location of the combined center of gravity of said first and second members as the latter are moved thereby counterbalancing the weight thereof.

2. A splash and chip guard as defined in claim 1 and wherein the length of said rigid link means is less than the distance between the two hinging means.

3. A splash and chip guard as defined in claim 1 and wherein said first member is provided with a substantially planar main portion and an integral extension portion disposed at an angle thereto while said first mentioned hinge means is secured to said first member remotely from said integral extension portion and said second mentioned hinging means connects the second member at its upper longitudinal edge to the free edge of the extension portion of the first member.

4. A splash and chip guard as defined in claim 1 and wherein said first member is provided along one longitudinal side thereof with a substantially right angled integral extension portion to which the first mentioned hinging means is connected and which portion is provided with an opening, while said elongated spring means extends through said opening and beneath the main portion of the first member when said member is in the horizontal position.

5. A splash and chip guard adapted to be used with a machine tool of the type having a longitudinally extending work area and a horizontal longitudinally extending frame member located centrally above the work area and comprising a first member having a substantially planar main portion and an integral extension portion at one longitudinal edge of the main portion and formed on a radius so as to have its free edge downwardly extending when said main portion is horizontal, said main portion of said first member at its other longitudinal edge having a substantially right angled integral extension portion shorter than said first named extension portion and provided with an opening, hinge means secured to said right angled integral extension portion and adapted to be secured to the horizontally extending frame member of the machine tool for pivotally connecting the first member thereto for swinging movement about a horizontal axis between substantially vertical and horizontal positions, a second member, means hinging the second member at its upper longitudinal edge to the free edge of the first mentioned extension portion of the first member so that said second member extends substantially vertically downwardly when said first member is positioned substantially horizontally, rigid link means pivotally connected at one end thereof to said second member adjacent the upper longitudinal edge of the latter and adapted to be connected at the opposite end thereof to said frame member of the machine tool at a lower level than said first mentioned hinge means to maintain said second member always in a vertical position as said first member is moved between the horizontal and vertical positions, said rigid link means being of a length less than the distance between the two hinging means, and an elongated spring means connected at one end to the underside of said first member when said member is in horizontal position and adjacent the junction of said main portion of said first member with said first named integral extension, said spring means passing through the opening in the second mentioned extension of said first member and being adapted to be connected at its other end to said frame member of the machine tool in a manner such that the force of said spring varies in accordance with variations in the location of the combined center of gravity of said first and second members as the latter are moved thereby counterbalancing the weight thereof.

References Cited in the file of this patent

UNITED STATES PATENTS

| | | |
|---|---|---|
| 1,689,719 | Drake | Oct. 30, 1928 |
| 1,764,578 | O'Brien | June 17, 1930 |
| 1,911,914 | McIlvried | May 30, 1933 |
| 1,960,953 | Pascoo | May 29, 1934 |
| 2,014,591 | Sanders | Sept. 17, 1935 |
| 2,107,799 | Pierson | Feb. 8, 1938 |
| 2,322,129 | Hawkins | June 15, 1943 |
| 2,334,749 | Burr | Nov. 23, 1943 |

FOREIGN PATENTS

| | | |
|---|---|---|
| 669,579 | France | Feb. 13, 1929 |